United States Patent
Zhang

(10) Patent No.: US 10,727,679 B2
(45) Date of Patent: *Jul. 28, 2020

(54) CHARGEABLE DEVICE AND CHARGING METHOD

(71) Applicant: GUANGDONG OPPO MOBILE TELECOMMUNICATIONS CORP., LTD, Dongguan, Guangdong (CN)

(72) Inventor: Jialiang Zhang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 160 days.

This patent is subject to a terminal disclaimer.

(21) Appl. No.: 15/555,399

(22) PCT Filed: Feb. 15, 2017

(86) PCT No.: PCT/CN2017/073653
§ 371 (c)(1),
(2) Date: Sep. 1, 2017

(87) PCT Pub. No.: WO2018/068454
PCT Pub. Date: Apr. 19, 2018

(65) Prior Publication Data
US 2018/0358818 A1  Dec. 13, 2018

Related U.S. Application Data

(63) Continuation-in-part of application No. PCT/CN2016/101944, filed on Oct. 12, 2016.

(51) Int. Cl.
H02J 7/00 (2006.01)
H02J 7/04 (2006.01)
H01M 10/44 (2006.01)

(52) U.S. Cl.
CPC ......... *H02J 7/0019* (2013.01); *H01M 10/441* (2013.01); *H02J 7/008* (2013.01);
(Continued)

(58) Field of Classification Search
CPC .................................................. H01M 10/441
(Continued)

(56) References Cited

U.S. PATENT DOCUMENTS 5,254,931 A * 10/1993 Martensson ............ H02J 7/008
320/114
6,841,971 B1   1/2005 Spee et al.
(Continued)

FOREIGN PATENT DOCUMENTS

CN   101986502 A   3/2011
CN   103094939 A   5/2013
(Continued)

OTHER PUBLICATIONS

Office Action 1 issued in corresponding European application No. 17189332.4 dated Feb. 25, 2019.
(Continued)

*Primary Examiner* — Yalkew Fantu

(57) ABSTRACT

A chargeable device and a charging method are proposed. The chargeable device includes a charging interface and a first charging circuit coupled to the charging interface. The first charging circuit receives voltage and current outputted by an adapter through the charging interface and to apply the voltage and current outputted by the adapter between two terminals of multiple cells coupled in series built in the chargeable device to charge the multiple cells directly.

24 Claims, 5 Drawing Sheets

(52) U.S. Cl.
CPC .......... *H02J 7/0014* (2013.01); *H02J 7/0016* (2013.01); *H02J 7/0024* (2013.01); *H02J 7/0026* (2013.01); *H02J 7/0029* (2013.01); *H02J 7/0031* (2013.01); *H02J 7/00036* (2020.01); *H02J 7/0068* (2013.01); *H02J 7/00302* (2020.01); *H02J 7/045* (2013.01); *H02J 7/00034* (2020.01); *H02J 2207/40* (2020.01)

(58) Field of Classification Search
USPC .......................................................... 320/107
See application file for complete search history.

(56) References Cited

U.S. PATENT DOCUMENTS

| | | | | |
|---|---|---|---|---|
| 7,076,375 | B2* | 7/2006 | Raichle | H02J 7/0052 702/63 |
| 2007/0139012 | A1 | 6/2007 | Hayashigawa | |
| 2008/0074077 | A1 | 3/2008 | Wong et al. | |
| 2009/0027013 | A1 | 1/2009 | Odaohhara | |
| 2011/0193525 | A1 | 8/2011 | Ro | |
| 2011/0254507 | A1 | 10/2011 | Chan | |
| 2012/0112705 | A1* | 5/2012 | Wang | H02J 7/0052 320/152 |
| 2012/0119694 | A1 | 5/2012 | Carpenter et al. | |
| 2014/0292278 | A1* | 10/2014 | Wu | H02J 7/0003 320/112 |
| 2015/0263638 | A1 | 9/2015 | Yang | |
| 2015/0295426 | A1* | 10/2015 | Hirosawa | H02J 7/0019 713/322 |
| 2016/0064962 | A1 | 3/2016 | Huang et al. | |
| 2016/0064979 | A1 | 3/2016 | Huang et al. | |
| 2017/0040810 | A1 | 2/2017 | Hu et al. | |
| 2017/0244264 | A1* | 8/2017 | Zhang | H01M 10/44 |

FOREIGN PATENT DOCUMENTS

| | | |
|---|---|---|
| CN | 103762702 A | 4/2014 |
| CN | 203747451 U | 7/2014 |
| CN | 104022542 A | 9/2014 |
| CN | 104810875 A | 7/2015 |
| CN | 104810877 A | 7/2015 |
| CN | 104917271 A | 9/2015 |
| CN | 204668976 U | 9/2015 |
| CN | 104967201 A | 10/2015 |
| CN | 104993182 A | 10/2015 |
| CN | 105098900 A | 11/2015 |
| CN | 105162206 A | 12/2015 |
| CN | 105471001 A | 4/2016 |
| CN | 105720645 A | 6/2016 |
| CN | 105896670 A | 8/2016 |
| CN | 106026327 A | 10/2016 |
| EP | 2879266 A1 | 6/2015 |
| EP | 3131172 A1 | 2/2017 |
| EP | 3334005 A1 | 6/2018 |
| JP | H06024357 U | 3/1994 |
| JP | H07143052 A | 6/1995 |
| JP | H9-121462 A | 5/1997 |
| JP | H10256983 A | 9/1998 |
| JP | 2006353010 A | 12/2006 |
| JP | 2007336664 A | 12/2007 |
| JP | 2009159726 A | 7/2009 |
| JP | 2011004509 A | 1/2011 |
| JP | 2011067021 A | 3/2011 |
| JP | 2011139622 A | 7/2011 |
| JP | 2012249410 A | 12/2012 |
| JP | 2014-87200 A | 5/2014 |
| JP | 2014233128 A | 12/2014 |
| JP | 2015100236 A | 5/2015 |
| JP | 2016509463 A | 3/2016 |
| JP | 2016073066 A | 5/2016 |
| JP | 2016134969 A | 7/2016 |
| JP | 2017507636 A | 3/2017 |
| TW | 201136094 A | 10/2011 |
| TW | 1479774 B | 4/2015 |
| TW | 201534021 A | 9/2015 |
| TW | 201535928 A | 9/2015 |
| TW | 201539935 A | 10/2015 |
| TW | M518824 U | 3/2016 |
| WO | 2015185452 A1 | 12/2015 |
| WO | 2016074458 A1 | 5/2016 |
| WO | 2016098631 A1 | 6/2016 |

OTHER PUBLICATIONS

Office Action 1 issued in corresponding European application No. 17793560.8 dated Feb. 24, 2019.
Office Action 1 issued in corresponding AU application No. 2017297856 dated Aug. 1, 2018.
IN First Examination Report issued in corresponding IN application No. 201717042580 dated Jan. 27, 2020.
English translation of Office Action 1 issued in corresponding CN application No. 201780001422.2 dated Apr. 23, 2020.
English translation of Office Action issued in corresponding JP application No. 2019-112263 dated May 15, 2020.

* cited by examiner

CHARGEABLE DEVICE AND CHARGING METHOD

CROSS REFERENCE TO RELATED APPLICATION

This application is a US national phase application of International Application No. PCT/CN2017/073653, filed on Feb. 15, 2017, which claims priority to International Application No. PCT/CN2016/101944, filed on Oct. 12, 2016. The disclosures of the above applications are incorporated herein by reference in their entireties.

BACKGROUND

1. Field of the Disclosure

The present disclosure relates to the field of charging, and more particularly, to a chargeable device and a charging method.

2. Description of Related Art

Chargeable devices, such as smart phones, are widely used in the market but require frequent charging for they consume a lot of power.

To increase charging speed, the chargeable devices are charged with high current. However, it is inevitable that the chargeable devices overheat when charged with high current at high charging speed.

Therefore, it is necessary to lower heat generated by the chargeable devices while ensuring charging speed.

SUMMARY

An object of the present disclosure is to propose a chargeable device and a charging method. The heat generated by the chargeable device can decrease while ensuring charging speed.

In a first aspect of the present disclosure, a chargeable device includes a charging interface and a first charging circuit coupled to the charging interface. The first charging circuit is configured to receive voltage and current outputted by an adapter through the charging interface and to apply the voltage and current outputted by the adapter between a positive terminal and a negative terminal of multiple cells coupled in series built in the chargeable device directly to charge the multiple cells directly.

In some embodiments according to the first aspect of the present disclosure, the chargeable device further includes a step-down circuit and a supply circuit. An input terminal of the step-down circuit is coupled to two terminals of the multiple cells. The step-down circuit is configured to convert the total voltage of the multiple cells into a first voltage $V_1$ where $a \leq V_1 \leq b$ stands, a indicates the least operating voltage of the chargeable device, and b indicates the maximum operating voltage of the chargeable device. The supply circuit is coupled to the output terminal of the step-down circuit. The supply circuit supplies power to the device based on the first voltage.

In some embodiments according to the first aspect of the present disclosure, the step-down circuit is a charge pump. The first voltage is 1/N of the total voltage of the multiple cells, where N indicates the number of cells of the multiple cells 13.

In some embodiments according to the first aspect of the present disclosure, the chargeable device further includes a supply circuit. The supply circuit is coupled to one of the multiple cells and configured to supply electrical power suitable for the components of the chargeable device based on the voltage of the selected one of the multiple cells.

In some embodiments according to the first aspect of the present disclosure, the chargeable device further includes a balance circuit coupled to the multiple cells. The balance circuit is configured to balance voltage between the multiple cells.

In some embodiments according to the first aspect of the present disclosure, the current outputted by the adapter and received by the first charging circuit is a pulsating DC current, an alternating current, or a constant DC current.

In some embodiments according to the first aspect of the present disclosure, the voltage and current outputted by the adapter and received by the first charging circuit is configured to charge the multiple cells under a constant current mode.

In some embodiments according to the first aspect of the present disclosure, the chargeable device further includes a second charging circuit. The second charging circuit includes a voltage boost circuit coupled between the charging interface and the multiple cells. The voltage boost circuit converts the voltage outputted from the adapter into a second voltage. The second voltage is applied between the positive terminal and the negative terminal of the multiple cells to charge the multiple cells. The voltage value outputted from the adapter is less than a total voltage of the multiple cells, and the second voltage value is greater than the total voltage of the multiple cells.

In some embodiments according to the first aspect of the present disclosure, the voltage outputted by the adapter and received by the second charging circuit is five volts (5V).

In some embodiments according to the first aspect of the present disclosure, the chargeable device and the adapter are selectively operable in a first charging mode or a second charging mode. A charging rate of the chargeable device operable in the second charging mode is faster than a charging rate of the chargeable device operable in the first charging mode. The adapter charges the multiple cells through the first charging circuit when the chargeable device and the adapter are selectively operable in the second charging mode, and the adapter charges the multiple cells through the second charging circuit when the chargeable device and the adapter are selectively operable in the first charging mode.

In some embodiments according to the first aspect of the present disclosure, the charging interface includes a data line. The chargeable device further comprises a control circuit that supports bidirectional communication with the adapter through the data line to control output of the adapter operable in the second charging mode.

In some embodiments according to the first aspect of the present disclosure, the control circuit communicates with the adapter in a means of bidirectional communication to negotiate a charging mode which the chargeable device and the adapter are operable in.

In some embodiments according to the first aspect of the present disclosure, the control circuit receives a first instruction sent by the adapter. The first instruction is configured to inquire whether the chargeable device enables the second charging mode. The control circuit sends a reply instruction responsive to the first instruction to the adapter. The reply instruction responsive to the first instruction configured to indicate that the chargeable device whether agrees to enable the second charging mode. The control circuit controls the adapter to charge the multiple cells through the first charging circuit when the chargeable device agrees to enable the second charging mode.

In some embodiments according to the first aspect of the present disclosure, the control circuit communicates with the adapter in the means of bidirectional communication to ensure a charging voltage outputted by the adapter operable in the second charging mode and configured to charge the chargeable device.

In some embodiments according to the first aspect of the present disclosure, the control circuit receives a second instruction sent by the adapter, the second instruction configured to inquire whether the voltage outputted by the adapter matches a present total voltage of the multiple cells. The control circuit sends a reply instruction responsive to the second instruction to the adapter, the reply instruction responsive to the second instruction configured to indicate that the voltage outputted by the adapter matches the present total voltage of the multiple cells, the voltage outputted by the adapter is less than the present total voltage of the multiple cells, or the voltage outputted by the adapter is greater than the present total voltage of the multiple cells.

In some embodiments according to the first aspect of the present disclosure, a process that the control circuit communicates with the adapter in the means of bidirectional communication through the data line to control the output of the adapter operable in the second charging mode includes: the control circuit communicates with the adapter in the means of bidirectional communication to ensure a charging current outputted by the adapter operable in the second charging mode and configured to charge the chargeable device.

In some embodiments according to the first aspect of the present disclosure, a process that the control circuit communicates with the adapter in the means of bidirectional communication to ensure the charging current outputted by the adapter operable in the second charging mode and configured to charge the chargeable device includes: the control circuit receives a third instruction sent by the adapter, the third instruction configured to inquire a maximum charging current for the chargeable device currently. The control circuit sends a reply instruction responsive to the third instruction to the adapter, the reply instruction responsive to the third instruction configured to indicate the maximum charging current for the chargeable device, whereby the adapter adjusts an outputted charging current operable in the second charging mode based on the reply instruction responsive to the third instruction and indicative of the maximum charging current for the chargeable device.

In some embodiments according to the first aspect of the present disclosure, the control circuit communicates with the adapter in the means of bidirectional communication to adjust the current outputted by the adapter in the charging process operable in the second charging mode.

In some embodiments according to the first aspect of the present disclosure, the control circuit receives a fourth instruction sent by the adapter, the fourth instruction configured to inquire the present total voltage of the multiple cells. The control circuit sends a reply instruction responsive to the fourth instruction to the adapter The reply instruction responsive to the fourth instruction is configured to indicate the present total voltage of the multiple cells, whereby the adapter adjusts an outputted charging current based on the reply instruction responsive to the fourth instruction and indicative of the present total voltage of the multiple cells.

In a second aspect of the present disclosure, a charging method for charging a chargeable device is provided. The chargeable device includes a charging interface. The charging method includes the following operations. Voltage and current outputted by an adapter through the charging interface is received. The voltage and current outputted by the adapter is applied between a positive terminal and a negative terminal of multiple cells coupled in series built in the chargeable device to directly charge the multiple cells.

In some embodiments according to the second aspect of the present disclosure, the charging method further includes: electrical power suitable for the components of the chargeable device is supplied based on the voltage of the selected one of the multiple cells.

In some embodiments according to the second aspect of the present disclosure, the charging method further includes: voltage between the multiple cells is balanced.

In some embodiments according to the second aspect of the present disclosure, the charging method further includes: converting the voltage outputted by the adapter through the charging interface to second voltage, and applying the second voltage between the positive terminal and the negative terminal of the multiple cells to charge the multiple cells. The second voltage value is greater than a total voltage of the multiple cells.

In some embodiments according to the second aspect of the present disclosure, the chargeable device and the adapter are selectively operable in a first charging mode or a second charging mode, and a charging rate of the chargeable device operable in the second charging mode is faster than a charging rate of the chargeable device operable in the first charging mode.

In some embodiments according to the second aspect of the present disclosure, the charging interface includes a data line. The charging method further includes: communicating with the adapter in a means of bidirectional communication through the data line to control output of the adapter operable in the second charging mode.

In some embodiments according to the second aspect of the present disclosure, the communicating with the adapter in the means of bidirectional communication through the data line to control output of the adapter operable in the second charging mode includes: communicating with the adapter in the means of bidirectional communication to negotiate a charging mode which the adapter and the chargeable device are operable in.

In some embodiments according to the second aspect of the present disclosure, the communicating with the adapter in the means of bidirectional communication to negotiate the charging mode between the adapter and the chargeable device includes: receiving a first instruction sent by the adapter, sending a reply instruction responsive to the first instruction to the adapter, and controlling the adapter to charge the multiple cells through the first charging circuit when the chargeable device agrees to enable the second charging mode. The first instruction is configured to inquire whether the chargeable device enables the second charging mode. The reply instruction responsive to the first instruction is configured to indicate that the chargeable device whether agrees to enable the second charging mode.

In some embodiments according to the second aspect of the present disclosure, the communicating with the adapter in the means of bidirectional communication through the data line to control the output of the adapter operable in the second charging mode includes: communicating with the adapter in the means of bidirectional communication to ensure a charging voltage outputted by the adapter operable in the second charging mode to charge the chargeable device.

In some embodiments according to the second aspect of the present disclosure, the communicating with the adapter in the means of bidirectional communication to ensure the charging voltage outputted by the adapter operable in the second charging mode to charge the chargeable device, includes: receiving a second instruction sent by the adapter, and sending a reply instruction responsive to the second instruction to the adapter. The second instruction is configured to inquire whether the voltage outputted by the adapter matches a present total voltage of the multiple cells. The reply instruction responsive to the second instruction is configured to indicate that the voltage outputted by the adapter matches the present total voltage of the multiple cells, the voltage outputted by the adapter is greater than the present total voltage of the multiple cells, or the voltage outputted by the adapter is less than the present total voltage of the multiple cells.

In some embodiments according to the second aspect of the present disclosure, the communicating with the adapter in the means of bidirectional communication through the data line to control the output of the adapter operable in the second charging mode includes: communicating with the adapter in the means of bidirectional communication to ensure a charging current outputted by the adapter operable in the second charging mode to charge the chargeable device.

In some embodiments according to the second aspect of the present disclosure, the communicating with the adapter in the means of bidirectional communication to ensure a charging current outputted by the adapter operable in the second charging mode to charge the chargeable device includes: receiving a third instruction sent by the adapter, and sending a reply instruction responsive to the third instruction to the adapter. The third instruction is configured to inquire a maximum charging current for the chargeable device currently. The reply instruction responsive to the third instruction is configured to indicate the maximum charging current for the chargeable device. The adapter adjusts an outputted charging current operable in the second charging mode based on the reply instruction responsive to the third instruction and indicative of the maximum charging current for the chargeable device.

In some embodiments according to the second aspect of the present disclosure, the communicating with the adapter in the means of bidirectional communication through the data line to control the output of the adapter operable in the second charging mode includes: communicating with the adapter in the means of bidirectional communication to adjust the current outputted by the adapter in a charging process operable in the second charging mode.

In some embodiments according to the second aspect of the present disclosure, the communicating with the adapter in the means of bidirectional communication to adjust the current outputted by the adapter in the charging process operable in the second charging mode includes: receiving a fourth instruction sent by the adapter, and sending a reply instruction responsive to the fourth instruction to the adapter. The fourth instruction is configured to inquire the present total voltage of the multiple cells. The reply instruction responsive to the fourth instruction is configured to indicate the present total voltage of the multiple cells. The adapter adjusts an outputted charging current based on the reply instruction responsive to the fourth instruction and indicative of the present total voltage of the multiple cells.

In the present disclosure, the multiple cells are charged directly by a first charging circuit. A cell structure of the chargeable device is adjusted based on the scheme of direct charging. Upon a condition that the multiple cells coupled in series are charged as fast as a single cell, a charging current necessary for the multiple cells is 1/N of the charging current necessary for the single cell where N indicates the number of cells of the multiple cells coupled in series inside the chargeable device. In other words, compared with the scheme of the single cell, a value of charging current of the present disclosure is greatly reduced and the heat generated by the chargeable device is decreased in the process of charging on the premise that the charging speed is unchanged in the present disclosure.

DETAILED DESCRIPTION OF THE EMBODIMENTS

DESCRIPTION OF THE EMBODIMENTS

Figure 1:
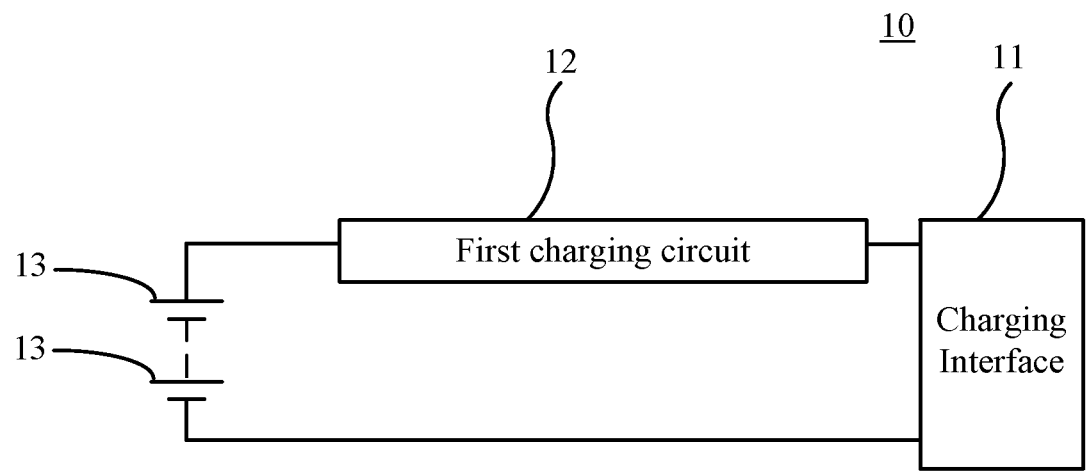
FIG. 1 illustrates a schematic diagram of a chargeable device according to a first embodiment of the present disclosure.

The present disclosure proposes an adapter for charging a chargeable device in the relevant technology. The adapter constantly maintains an output voltage when the adapter operates in a constant voltage mode, such as 5V, 9V, 12V, or 20V, etc.

Voltage output from the adapter is not suitable to be directly applied to a positive terminal and a negative terminal of a battery, rather, the voltage output from the adapter needs to be first converted through a converter circuit in a chargeable device so as to obtain an expected charging voltage and/or a charging current by a battery in the chargeable device.

The converter circuit is configured to convert the voltage output from the adapter so as to satisfy the expected requirement of the charging voltage and/or the charging current by the battery.

As an example, the converter circuit may refer to a charging management module, such as a charging integrated circuit (IC), which is configured to manage the charging voltage and/or the charging circuit of the battery during the charging process of the battery. The converter circuit has a function of a voltage feedback module and/or a function of a current feedback module to manage the charging voltage and/or the charging circuit of the battery.

For example, the charging process of the battery may include at least one of a trickle charging stage, a constant current charging stage, and a constant voltage charging stage. During the trickle charging stage, the converter circuit can utilize a current feedback loop so that a current entering into the battery satisfies a magnitude of the charging current expected by the battery (such as a first charging current) in the trickle charging stage. During the constant current charging stage, the converter circuit can utilize the current feedback loop so that the current entering into the battery satisfies magnitude of the charging current expected by the battery (such as a second charging current, the second charging current may be greater than the first charging current) in the constant current charging stage. During the constant voltage charging stage, the converter circuit can utilize a voltage feedback loop so that a voltage applied between the positive terminal and the negative terminal of the battery satisfies a magnitude of the charging voltage expected by the battery in the constant voltage charging stage.

As an example, when the voltage output from the adapter is greater than the charging voltage expected by the battery, the converter circuit can be configured to step down the voltage output from the adapter so that the charging voltage obtained after buck conversion satisfies the charging voltage expected by the battery. As another example, when the voltage output from the adapter is less than the charging voltage expected by the battery, the converter circuit can be configured to boost the voltage output from the adapter so that the charging voltage obtained after the boost conversion satisfies the charging voltage expected by the battery.

In yet another example, a constant 5V voltage output from the adapter is taken as an example. When the battery includes a single cell (take a lithium battery cell for example, a charging cut-off voltage of a single cell is 4.2V), the converter circuit (such as a buck circuit) can step down the voltage output from the adapter so that the charging voltage obtained after bucking satisfies the charging voltage expected by the battery.

In yet another example, the constant voltage of 5V output from the adapter is taken as an example. When the battery is a battery having two or more than two cells (take the lithium battery cell for example, the charging cut-off voltage of the single cell is 4.2V) coupled in series, the converter circuit (such as a boost circuit) can boost the voltage output from the adapter so that the charging voltage obtained after boosting satisfies the charging voltage expected by the battery.

Because the converter circuit is limited by low conversion efficiency of the circuit, electrical energy that is not converted, is dissipated in a form of heat. This heat will accumulate inside the chargeable device (such as the terminal), where a design space and a heat dissipation space of the chargeable device (such as the terminal) are both limited (for example, a physical size of a mobile terminal used by a user becomes increasingly thin and light, and a great number of electronic components are closely arranged inside the mobile terminal to enhance performance of the mobile terminal). Not only does it create increased difficulty of designing the converter circuit, but also it is very difficult to dissipate heat accumulated inside the chargeable device (such as the terminal) in a timely manner, thus causing the chargeable device (such as the terminal) to become abnormal.

For example, heat accumulated by the converter circuit is likely to cause thermal interference with electronic components near the converter circuit so that the electronic components work abnormally; and/or, for example, the heat accumulated on the converter circuit is likely to shorten service lives of the converter circuit and the electronic components nearby; and/or, for example, the heat accumulated on the converter circuit is likely to cause thermal interference with the battery so that the battery charges and discharges abnormally; and/or, for example, the heat accumulated on the converter circuit is likely to raise temperature of the chargeable device (such as the terminal) so that the user experience is affected when the user charges; and/or, for example, the heat accumulated on the converter circuit is likely to cause a short circuit of the converter circuit itself so that the battery charges abnormally when the voltage output from the adapter is directly applied to the positive terminal and the negative terminal of a battery. Under the circumstances that the battery is over charged for a long time, the battery can even explode, which in turn causes a certain security concern.

The present disclosure provides an adapter capable of adjusting output voltage. The adapter according to the embodiment of the present disclosure can acquire battery state information. The battery state information at least includes a current battery level information and/or voltage information. The adapter adjusts an output voltage of the adapter itself based on the acquired battery state information to satisfy a charging voltage and/or a charging current expected by the battery. A voltage output from the adapter after adjustment can be directly applied to two terminals of the battery to charge the battery (hereinafter referred to as "direct charge"). Furthermore, adjusted voltage outputted by the adapter can directly apply on two terminals of a battery to charge the battery during a process of charging the battery under the constant current charging stage.

The adapter has functions of a voltage feedback module and a current feedback module, to achieve the closed-loop feedback control of the charging voltage and/or the charging circuit of the battery.

In some embodiments, the adapter adjusting the output voltage of the adapter itself based on the acquired battery state information may refer to the adapter can acquire the battery state information in a real-time manner and adjust the voltage output from the adapter itself based on real-time state information of the battery acquired every time, to satisfy the charging voltage and/or the charging current expected by the battery.

In some embodiments, the adapter adjusting the output voltage of the adapter itself based on the battery state information acquired in a real-time manner may refer to the adapter can acquire current state information of the battery at different times during a charging process as the charging voltage of the battery continues to rise during the charging process, and adjust the output voltage of the adapter itself based on the current state information of the battery in a real-time manner to satisfy the charging voltage and/or the charging current expected by the battery. The voltage output from the adapter after adjustment can be directly applied to the positive terminal and the negative terminal of the battery to charge the battery.

For example, the charging process of the battery may include at least one of a trickle charging stage, a constant current charging stage, and a constant voltage charging stage. During the trickle charging stage, the adapter can output a first charging current to charge the battery so as to satisfy the charging current expected by the battery (in some embodiments, the first charging current may be a constant DC current or a current in a pulsating waveform). During the constant current charging stage, the adapter can utilize a current feedback loop so that a current output from the adapter and enters into the battery satisfies the charging current expected by the battery (for example, a second charging current, the second charging current may be a current in a pulsating waveform; the second charging current may be greater than the first charging current. A peak value of the current in the pulsating waveform of the constant current charging stage may be greater than a peak value of the current in the pulsating waveform of the trickle charging stage, and a constant current of the constant current charging stage may refer to the peak value or an average value of the current in the pulsating waveform basically remaining unchanged). During the constant voltage charging stage, the adapter can utilize a voltage feedback loop so that a voltage (that is, constant DC voltage) output from the adapter to the chargeable device in the constant voltage charging stage is maintained constantly.

For example, the adapter according to the embodiment of the present disclosure can be mainly configured to control the constant current charging stage of the battery in the chargeable device. In other embodiments, functions of controlling the trickle charging stage and the constant voltage charging stage of the battery in the chargeable device may be cooperatively achieved by the adapter according to the embodiment of the present disclosure and an additional charging chip in the chargeable device. When compared with the constant current charging stage, charging power received by the battery in the trickle charging stage and the constant voltage charging stage is less, the efficiency conversion loss and heat accumulation of the charging chip in the chargeable device are thus acceptable. It is noted that the constant current charging stage or the constant current mode according to the embodiment of the present disclosure may refer to the charging mode that controls an output current of the adapter and does not require that the output current of the adapter to be maintained completely unchanged, for example, may refer to that the peak value or the average value of the current in the pulsating waveform output from the adapter basically remains unchanged or basically remains unchanged within a period of time. For example, in practice, the adapter in the constant current charging stage usually uses a multi-stage constant current charging method to charge.

The multi-stage constant current charging may have N constant current modes (N is a positive integer not less than 2). The multi-stage constant current charging uses a predetermined charging current to start a first charging stage. The N constant current modes of the multi-stage constant current charging are sequentially executed from the first stage to the (N−1)th stage. After a previous constant current mode is changed to a next constant current mode in the constant current modes, the peak value or the average value of the current in the pulsating waveform can become smaller. When a battery voltage reaches a threshold voltage value for terminating charging, the previous constant current mode will change to the next constant current mode in the constant current modes. The current conversion process between two constant current modes may be gradual, or may be a stepped jump.

Furthermore, in a case that current outputted by the adapter is a pulsating DC current, the constant current mode can refer to a charging mode which controls a peak value or an average of the pulsating DC current. Under such charging mode, the peak value of the pulsating DC current does not exceed the current corresponding to the constant current stage. In addition, in a case that current outputted by the adapter is an alternating current, the constant current mode can refer to a charging mode which controls a peak value of the alternating current.

In addition, it is noted that the term "terminal" as used in the embodiments of the present disclosure may include, but is not limited to, a device configured to be coupled via a wired connection (for example, via a public switched telephone network (PSTN), a digital subscriber line (DSL), a digital cable, a direct cable connection, and/or another data connection/network) and/or a device configured to receive/send a communication signal via a wireless interface (such as a cellular network, a wireless local area network (WLAN), a digital television network such as a DVB-H network, a satellite network, an AM-FM broadcast transmitter, and/or another communication terminal). A terminal configured to communicate via a wireless interface may be referred to as a "wireless communication terminal", a "wireless terminal", and/or a "mobile terminal". Examples of mobile terminal include, but are not limited to, a satellite or cell phone; a personal communication system (PCS) terminal that can combine a cellular radiotelephone, data processing, facsimile, and data communications capabilities; may include a radiotelephone, a pager, an Internet/Intranet access, a Web browser, an electronic organizer, a calendar, and/or a personal digital assistant (PDA) equipped with a global positioning System (GPS) receiver; and a common laptop and/or palm type receiver or some other electronic devices including a transmitter-receiver radiotelephone. In addition, the chargeable device or terminal includes a power bank which can be charged by the adapter to store energy. The stored energy in the power bank can supply other electronic device.

In addition, according to the embodiment of the present disclosure, when the voltage in the pulsating waveform output from the adapter is directly applied to the battery of the chargeable device so as to charge the battery, the charging current is characterized by a pulsating wave, such as a clipped pulsating wave, and it is understood that the charging current charges the battery in an intermittent manner. A period of the charging current changes depending on an input AC power, such as a frequency of an AC grid. For example, a frequency corresponding to the period of the charging current is an integer multiple or a reciprocal of the frequency of the AC grid. Additionally, when the charging current charges the battery in an intermittent manner, a current waveform corresponding to the charging current may be composed of one pulse or one group of pulses synchronized with the grid.

To serve as an example, according to the embodiment of the present disclosure, the battery can receive a pulsating direct current (direction unchanged, amplitude varying with time), an alternating current (both direction and amplitude varying with time), or a direct current (that is, a constant current, both amplitude and direction not varying with time) output from the adapter during the charging process (such as at least one of the trickle charging stage, the constant current charging stage, and the constant voltage charging stage).

In the related art, the chargeable device usually uses a single cell. The single cell charged by higher charging current causes the chargeable device to generate more heat. For restraining the chargeable device from generating more heat in the process of charging on the premise that the charging speed is unchanged, the chargeable device of the present disclosure uses multiple cells coupled in series in lieu of single cell. The multiple cells are charged directly. An embodiment of the present disclosure in conjunction to FIG. 1 is introduced in the following paragraphs.

FIG. 1 is a schematic diagram of a chargeable device according to a first embodiment of the present disclosure. A chargeable device 10 includes a charging interface 11 and a first charging circuit 12. The charging interface 11 is coupled to the first charging circuit 12. The first charging circuit 12 receives voltage and current outputted by an adapter through the charging interface 11. Besides, the first charging circuit 12 loads the voltage and current outputted by the adapter onto two terminals of multiple cells 13 coupled in series arranged inside the chargeable device 10 directly. In other words, the first charging circuit 12 charges the multiple cells 13 directly.

To solve the problem of heating arising from using the multiple cells 13 and to lower the loss of the power, the multiple cells 13 are charged directly through the first charging circuit 12 in the present disclosure.

The scheme of direct charging is good for decreasing generated heat to a certain degree. However, the chargeable device may be seriously overheated due to great current outputted by the adapter, such as current of 5A to 10A, which may be a risk of security. To ensure the charging speed and solve the overheating problem, a cell structure inside the chargeable device adopts multiple cells coupled in series based on the scheme of direct charging. Upon a condition that the multiple cells coupled in series are charged as fast as a single cell, a charging current necessary for the multiple cells is 1/N of the charging current necessary for the single cell where N indicates the number of cells of the multiple cells coupled in series inside the chargeable device. In other words, compared with the scheme of the single cell, a value of charging current of the present disclosure is greatly reduced and the heat generated by the chargeable device is decreased in the process of charging on the premise that the charging speed is unchanged in the present disclosure.

For example, the 3000 mAh single cell needs a 9A charging current to achieve the C-rate of 3C. The C-rate is a current rate, which is a unit used to set a current value and to estimate or indicate a possible use time of a battery under various conditions of use during charge and discharge of the battery. A charge or discharge time is divided by a rated capacity of the battery to calculate charge and discharge current values. The unit of the C-rate is C. To achieve the same charging speed and to lessen the heat generated by the chargeable device in the charging process, two cells coupled in series, each with 1500 mAh, replace the 3000 mAh single cell. In this way, the charging current of 4.5A just achieves the C-rate of 3C. Compared with the charging current of 9A, the heat produced by the charging current of 4.5A is obviously less.

It is noted that the first charging circuit 12 charges the multiple cells 13 by direct charging so the voltage outputted by the adapter and received by the first charging circuit 12 needs to be greater than the total voltage applied to the multiple cells 13. In general, the operating voltage of the single cell is between 3.0V and 4.35V. Take the two cells coupled in series for example, the voltage outputted by the adapter is set to be greater than or equal to 10V.

The type of the charging interface 11 is not limited by the present embodiment of the present disclosure. For example, a universal serial bus (USB) interface may be used. The USB interface may be a standard USB interface, a micro USB interface, or a Type-C interface. The first charging circuit 12 charges the multiple cells 13 through a power line in the USB port. The power line in the USB interface may be a VBus line and/or ground line in the USB port.

The multiple cells 13 may be cells with uniform or similar specifications or parameters, which not only facilitates management but also improves overall performance and lifetime of the multiple cells 13.

It is understood that the multiple cells 13 in series can divide the voltage outputted by the adapter.

Nowadays, a single cell is commonly applied to provide electricity in the chargeable device (or components or chips inside the chargeable device). The multiple cells 13 coupled in series are introduced in the present embodiment. The total voltage applied on the multiple cells 13 is greater so the multiple cells 13 are not suitable to provide electricity to the chargeable device 10 (or the components or the chips inside the chargeable device). To solve the problem, a possible method is to adjust the operating voltage of the chargeable device (or the components or the chips inside the chargeable device to support electricity supply to the multiple cells 13. However, this method affects the chargeable device sharply and produces a larger amount of costs. Accompanied by FIG. 2, FIG. 3a and FIG. 3b, the present embodiment of the present disclosure details a method to solve the problem of electricity supply to the multiple cells 13.

Figure 2:
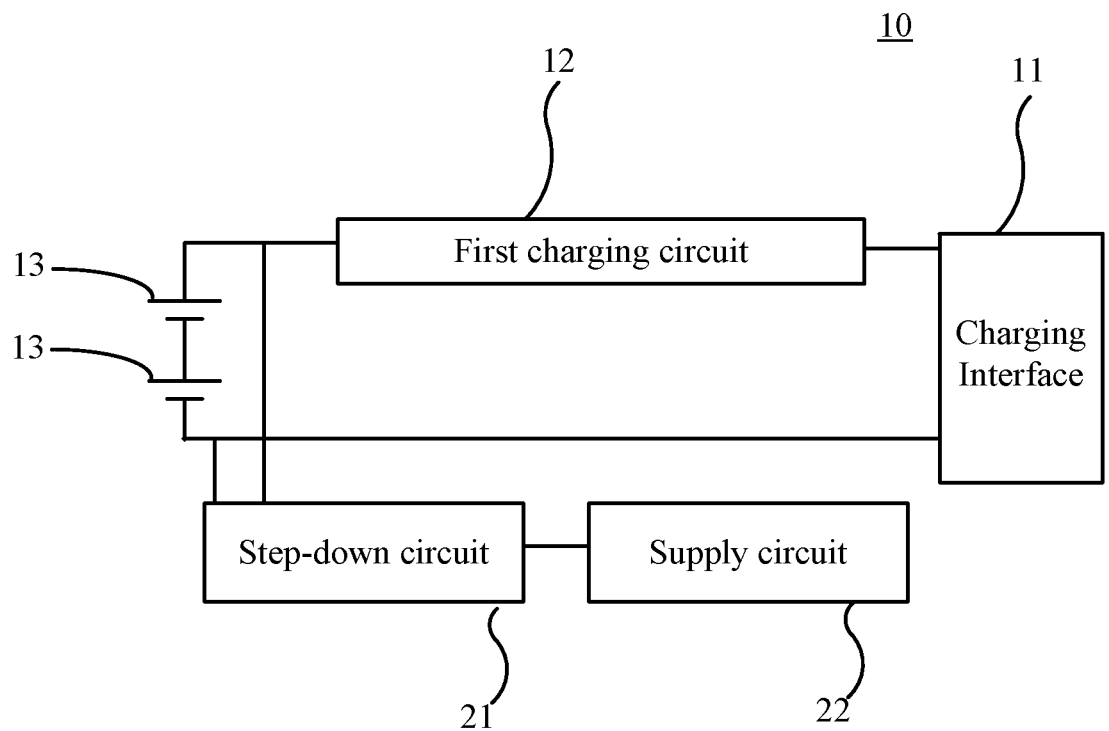
FIG. 2 illustrates a schematic diagram of the chargeable device according to a second embodiment of the present disclosure.

As FIG. 2 illustrates, the chargeable device 10 may further include a step-down circuit 21 and a supply circuit 22 in some embodiments. An input terminal of the step-down circuit 21 is coupled to two terminals of the multiple cells 13. The step-down circuit 21 is configured to convert the total voltage of the multiple cells 13 into a first voltage $V_1$ where $a \leq V_1 \leq b$ stands, a indicates the least operating voltage of the chargeable device 10 (the components inside the chargeable device 10 or the chip inside the chargeable device 10), and b indicates the maximum operating voltage of the chargeable device 10 (the components inside the chargeable device 10 or the chip inside the chargeable device 10). The supply circuit 22 is coupled to the output terminal of the step-down circuit 21. The supply circuit 22 supplies power to the chargeable device 10 based on the first voltage.

The step-down circuit 21 is introduced based on the embodiment illustrated by FIG. 1 in the present disclosure. When the chargeable device 10 operates, the total voltage of the multiple cells 13 is stepped down to a first voltage by the step-down circuit 21. The first voltage is ranged between the less operating voltage and the greatest operating voltage of the chargeable device 10 so the chargeable device 10 may be supplied with the first voltage directly. In this way, the problem of power supply with the multiple cells 13 is solved successfully.

The total voltage of the multiple cells 13 varies with the electric volume of the multiple cells 13. Therefore, the total voltage of the multiple cells 13 may be the current total voltage of the multiple cells 13. For example, the operating voltage of the single cell may range from 3.0 volts (V) to 4.35V. Provided that the multiple cells 13 includes two cells and that the current voltage of each of the two cells is 3.5V, the total voltage of the multiple cells 13 is 7V.

Provided that the operating voltage of the single cell ranges from 3.0V to 4.35V, parameter a is 3.0V and parameter b is 4.35V (a=3.0V and b=4.35V). To keep the supply voltage applied on the components inside the chargeable device 10 normal, the step-down circuit 21 may lower the total voltage of the multiple cells 13 to an arbitrary value ranging between 3.0V to 4.35V. The step-down circuit 21, such as a buck circuit or a charge pump, lowers the voltage.

For simplicity, the step-down circuit 21 may be a charge pump. The charge pump directly reduces the total voltage of the multiple cells 13 to 1/N of the present total voltage, where N indicates the number of cells of the multiple cells 13. A conventional buck circuit includes components such as a switch transistor and an inductor. Due to higher power loss of the inductor, using the buck circuit to step down voltage causes higher power loss due to higher power loss of the inductor. Compared with the buck circuit, the charge pump utilizes switch transistors and capacitors to step down the voltage. Basically, the capacitor does not consume extra energy so the adoption of the charge pump helps reduce the loss of power in the process of stepping down the voltage. Specifically, the switch transistor inside the charge pump controls charging and discharging of the capacitor in a certain way, and the input voltage reduces for a certain factor to obtain necessary voltage. (The factor chosen by the present disclosure is 1/N.)

Figure 3A:
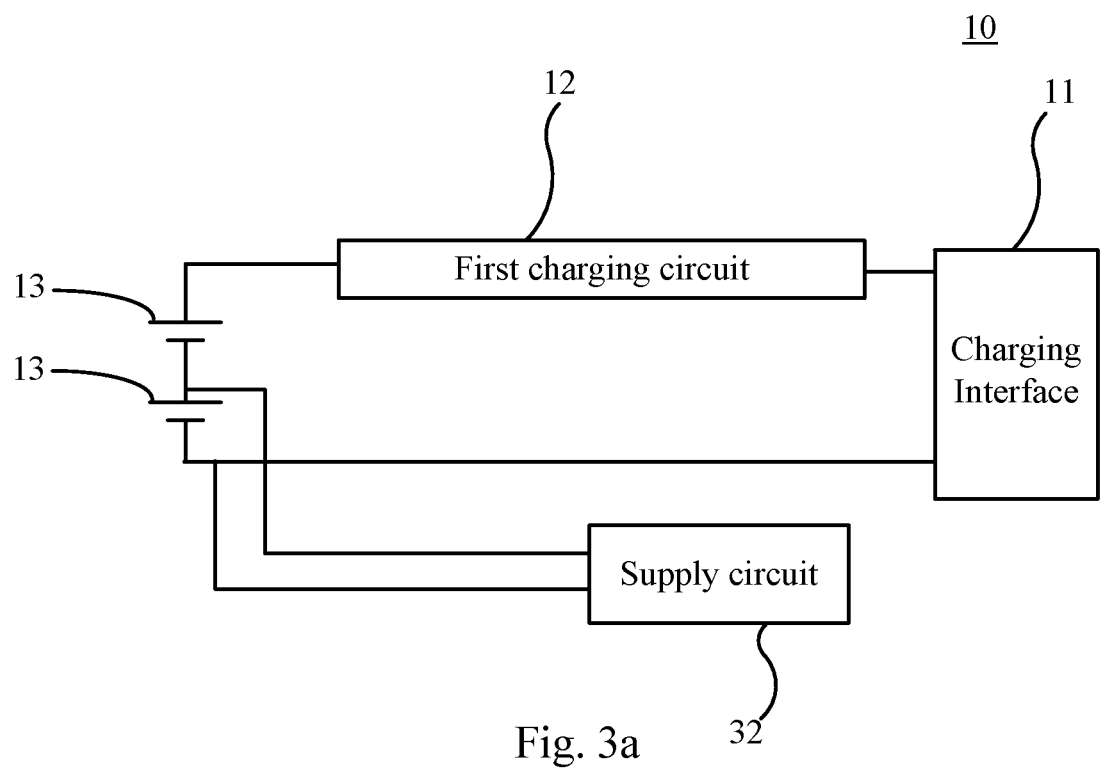
FIG. 3a illustrates a schematic diagram of the chargeable device according to a third embodiment of the present disclosure.

Optionally, in some embodiments, as FIG. 3a illustrates, the chargeable device 10 further includes a supply circuit 32. An input terminal of the supply circuit 32 is coupled to two terminal of any one cell of the multiple cells 13. The supply circuit 32 provides the components in the chargeable device 10 with electricity based on the voltage across the multiple cells 13.

It is understood that the voltage processed by the step-down circuit may occur ripples, affecting the quality of supplied power of the chargeable device 10. The supply voltage is from two terminals of any one cell of the multiple cells 13 directly to supply the components in the chargeable device 10 with electricity in the present disclosure. Since the supply voltage outputted by the cell is more stable, not only the scheme of providing electricity with the multiple cells works well, but also the quality of the supplied power of the chargeable device 10 is well maintained in the present disclosure.

Figure 3B:
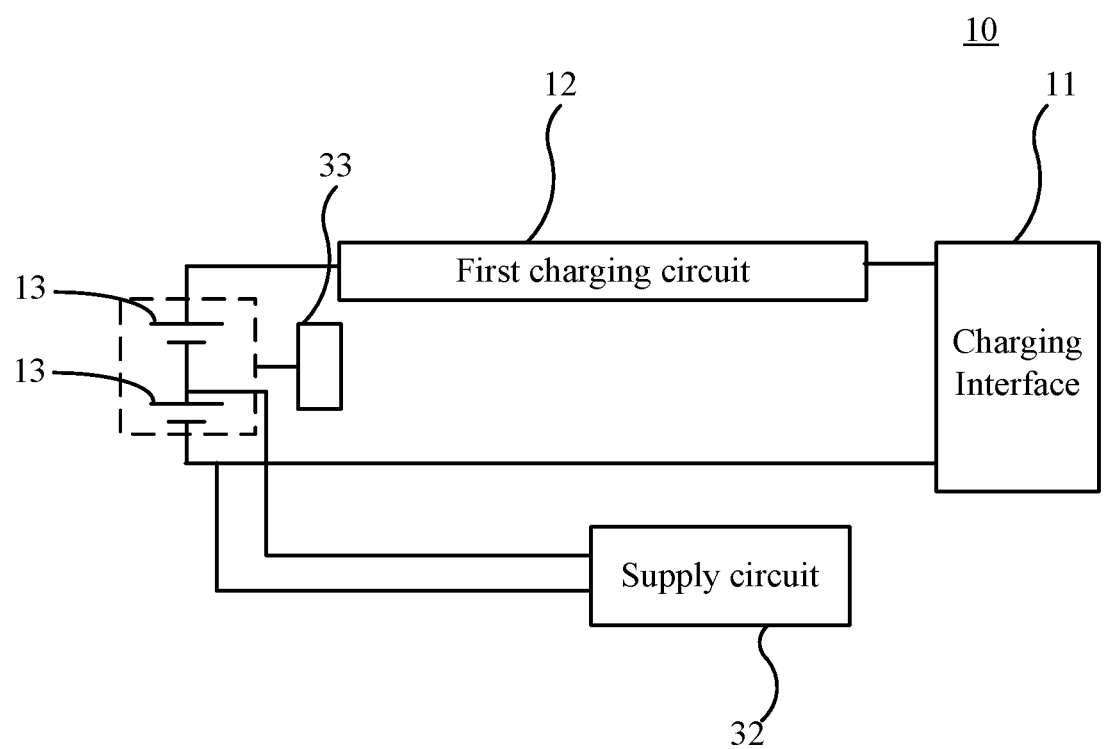
FIG. 3b illustrates a schematic diagram of the chargeable device according to a fourth embodiment of the present disclosure.

Furthermore, as FIG. 3b illustrates, the chargeable device 10 further includes a balance circuit 33 coupled to the multiple cells 13. The balance circuit 33 is configured to balance the voltage between the multiple cells 13.

As used herein, one of the multiple cells 13 configured to supply electricity to the components inside the chargeable device 10 is called "primary cell", and the other cells called "secondary cells." The primary cell continues consuming power after the power supply method illustrated in FIG. 3a is adopted, causing the voltage across the primary cell and the voltage across the secondary cell is not balanced (or inconsistent). Imbalance of voltages between the multiple cells 13 may influence overall performance negatively and affect the lifetime of the multiple cells 13 negatively. In addition, imbalance of voltages between the multiple cells 13 makes it harder to manage the multiple cells 13 consistently. Therefore, the balance circuit 33 is used in the present disclosure to balance the voltages across cells of the multiple cells 13, to enhance the overall performance of the multiple cells 13, and to facilitate uniform management of the multiple cells 13.

There are many ways of implementing the balance circuit 33. For example, using a load coupled to terminal of each cell to consume the electric volume of the secondary cell keeps the voltage across the secondary cell consistent with the voltage across the primary cell. Or, the primary cell is charged via the secondary cell until the voltage across the primary cell is consistent with the voltage across the secondary cell.

The increase in the output power of the adapter may cause a lithium precipitation easily when the cell inside the chargeable device is charged by the adapter. Accordingly, the lifetime of the cell is shortened.

Figure 4:
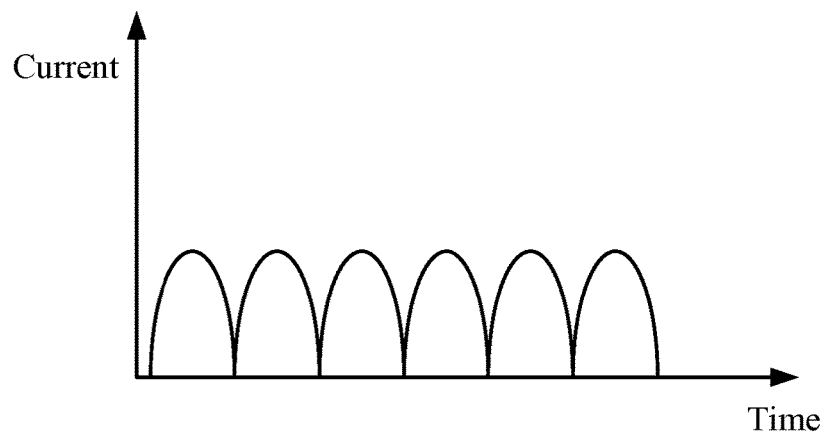
FIG. 4 illustrates a schematic diagram of a pulsating direct current.

To enhance reliability and security of the cell, an adapter is controlled to output a pulsating direct current (or called "unidirectional pulsating output current," "pulsating waveform current," or "pulsating current with a clipped waveform") in some embodiments. The first charging circuit 12 charges the multiple cells 13 by direct charge so the pulsating direct current outputted by the adapter can be applied to two terminals of the multiple cells 13 directly. As FIG. 4 illustrates, the pulsating direct current alternates periodically. Compared with a constant direct current, the pulsating direct current can reduce lithium precipitation of a cell and enhance the lifetime of the cell. In addition, compared with the constant direct current, the pulsating direct current can lower the probability and strength of an arc of a trigger point of a charging interface and increase the lifespan of the charging interface.

There are many ways to arrange an output current of the adapter to be a pulsating direct current. For example, an output current of the adapter is a pulsating direct current without a primary filter circuit and a secondary filter circuit in the adapter.

In some embodiments, a first charging circuit 12 receives an alternating current outputted by an adapter (for example, to remove a primary filter circuit, a secondary rectifier, and a secondary filter circuit in the adapter to obtain an alternating current outputted by the adapter). The alternating current reduces the possibility of lithium precipitation as well, which help shorten the lifetime of the cell.

In some embodiments, the voltage and current received by the first charging circuit 12 from the adapter through the charging interface 11 may be the voltage and current outputted by the adapter under a constant current mode (constant current charging mode or a constant current charging stage).

Figure 5:
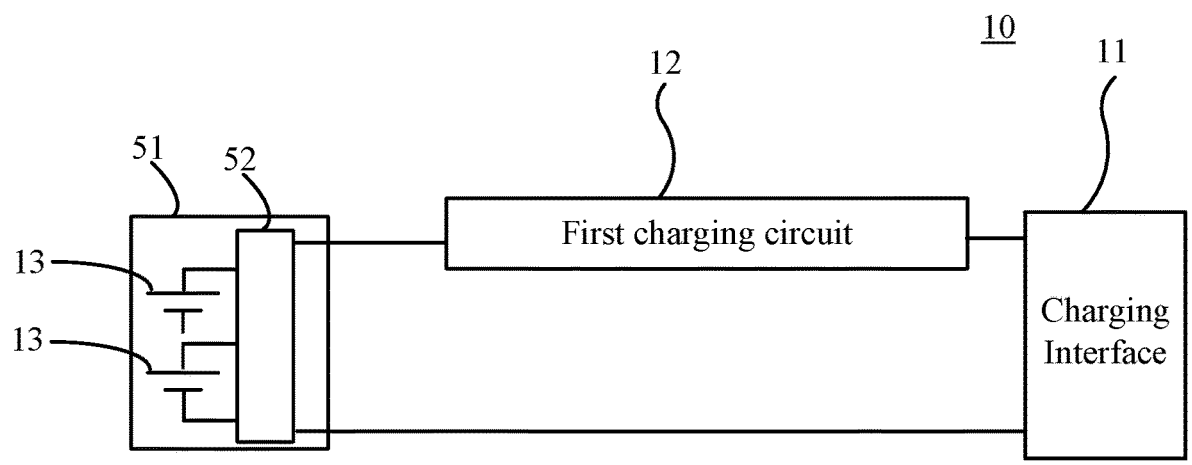
FIG. 5 illustrates a schematic diagram of the chargeable device according to a fifth embodiment of the present disclosure.

Optionally, the multiple cells 13 may be packaged in a battery 51 as well in some embodiments, as FIG. 5 illustrates. Further, the battery 51 further includes a cell protection plate 52. The battery 51 has functions of over-voltage and over-current protection, electricity balance management, electricity management.

Optionally, in some embodiments, the multiple cells 13 may be packaged in a plurality of batteries 51.

Figure 6:
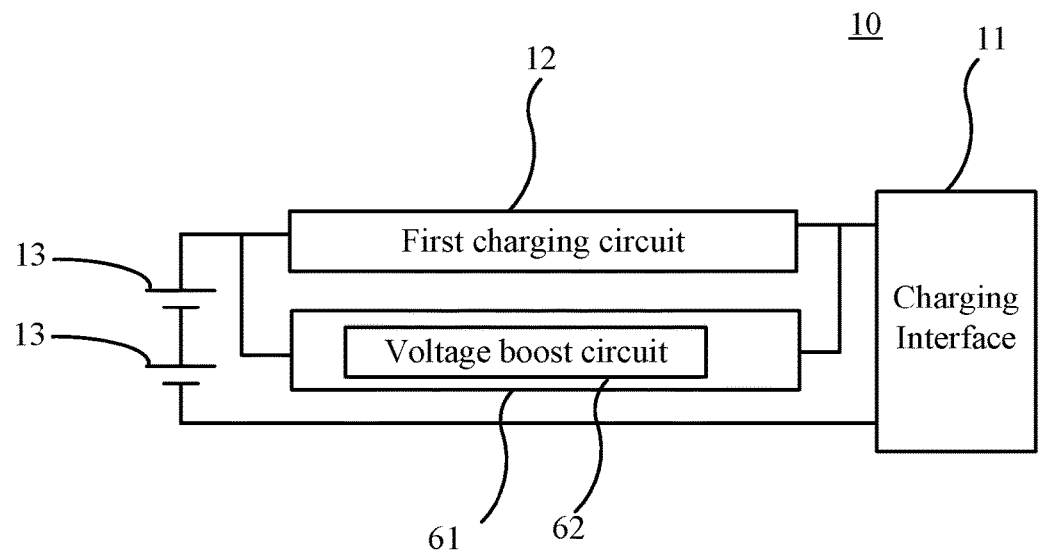
FIG. 6 illustrates a schematic diagram of the chargeable device according to a sixth embodiment of the present disclosure.

Optionally, in some embodiments, the chargeable device 10 further includes a second charging circuit 61, as illustrated in FIG. 6. The second charging circuit 61 may include a voltage boost circuit 62. Two terminals of the voltage boost circuit 62 are coupled to a charging interface 11 and a multiple cells 13 correspondingly. The voltage boost circuit 62 receives voltage outputted by an adapter through the charging interface 11, and the voltage outputted by the adapter is elevated to be the second voltage. The second voltage is applied between the positive terminal and the negative terminal of the multiple cells 13 to charge the multiple cells 13. The voltage outputted by the adapter and received by the second charging circuit 61 is less than the total voltage of the multiple cells 13. The second voltage is greater than the total voltage of the multiple cells 13.

As mentioned, the multiple cells 13 are charged directly through the first charging circuit 12. Based on the direct charging method, the voltage outputted by the adapter needs to be greater than the total voltage of the multiple cells 13. For example, provided that two cells are coupled in series and present voltage of each cell is 4V, the voltage outputted by the adapter needs to be 8V or more. However, the output voltage of a standard adapter (as the adapter mentioned above) is 5V so it is impossible to charge the multiple cells 13 through the first charging circuit 12. In order that a standard adapter can be adopted by the present disclosure as well, the second charging circuit 61 is provided in the present embodiment. The second charging circuit 61 includes a voltage boost circuit 62. The voltage boost circuit 62 may be configured to elevate the voltage outputted by the adapter to be the second voltage. Thus, the voltage outputted by the adapter is greater than the total voltage of the multiple cells 13. In this way, the problem that a standard adapter fails to charge the multiple cells 13 coupled in series is well solved.

The voltage outputted by the adapter and received by the second charging circuit 61 is not limited by the present embodiment of the present disclosure. As long as the voltage outputted by the adapter is less than the total voltage of the multiple cells 13, the multiple cells 13 can be charged by elevated voltage through the second charging circuit 61.

The voltage boost circuit 62 is not limited by the present embodiment. For example, a boost circuit is adopted, or a charge pump is configured to raise voltage. Optionally, the second charging circuit 61 may adopt a conventional design of the charging circuit in some embodiments; that is, a converting circuit (such as a charging integrated circuit) is arranged between the charging interface and the cell. The converting circuit may control the adapter to keep constant voltage and constant current in the process of charging and adjust the voltage outputted by the adapter according to practical demands such as raising voltage or lowering voltage. The voltage outputted by the adapter is raised over the second voltage of the total voltage of the multiple cells 13 by using the function of raising voltage of the multiple cells 13 in the present embodiment. It is understood that switch between the first charging circuit 12 and the second charging circuit 61 may be realized through a switch and a control circuit. For example, a control circuit is arranged inside the chargeable device, and the control circuit may swiftly switch between the first charging circuit 12 and the second charging circuit 61 according to practical demands (the type of the adapter).

Optionally, an adapter supports a first charging mode and a second charging mode in some embodiments. The adapter charges the chargeable device operable in the second charging mode faster than the adapter charges the chargeable device on the first charging mode. In other words, it takes less time for the adapter to charge the battery with the same electricity volume operable in the second charging mode compared with the adapter operable in the second charging mode. Further, an adapter charges a multiple cells 13 through the second charging circuit 61 operable in the second charging mode in some embodiments. Besides, the adapter charges the multiple cells 13 through the first charging circuit 12 operable in the second charging mode.

The first charging mode may be a normal charging mode. The second charging mode may be a fast charging mode. The normal charging mode means that the adapter outputs a comparably smaller amount of current (usually less than 2.5A) or a comparably smaller amount of power (usually less than 15 W) to charge a battery in the chargeable device. It usually takes several hours to fill up a battery with a larger amount (like with an amount of 3000 milliampere) on the normal charging mode. The adapter outputs a comparably larger amount of current (usually greater than 2.5A, like 4.5A, 5A, or more) or a comparably larger amount of power (usually more than or equal to 15 W) to charge the battery in the chargeable device by the fast charging mode. Compared with the normal charging mode, the charging rate of the adapter is faster on the fast charging mode so it takes less time to full up a battery with the same volume obviously.

Figure 7:
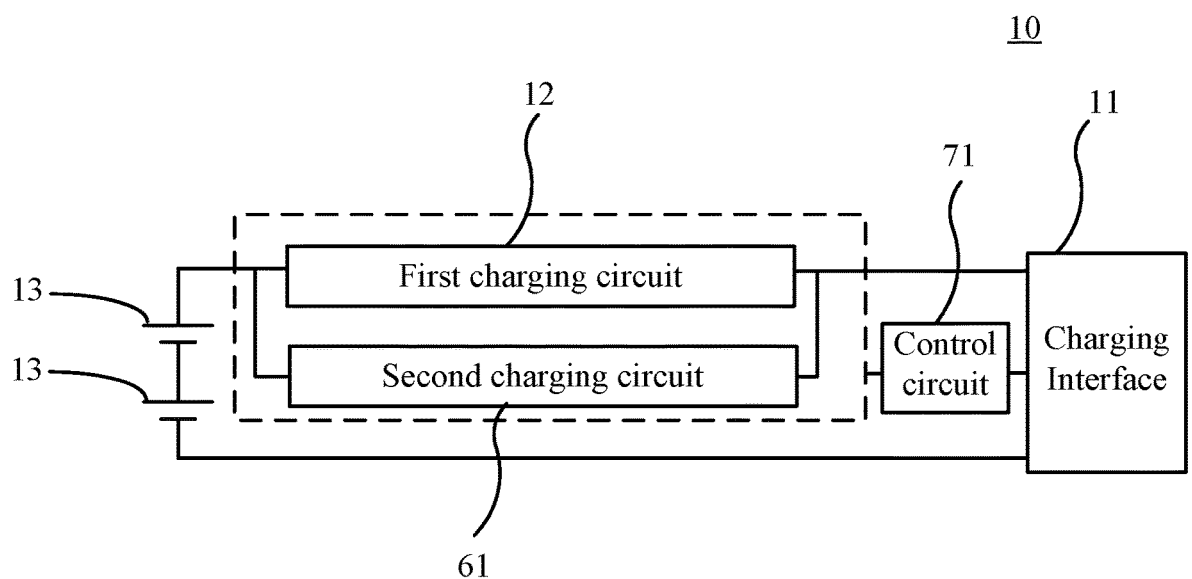
FIG. 7 illustrates a schematic diagram of the chargeable device according to a seventh embodiment of the present disclosure.

Further, the charging interface 11 may include a data line, as FIG. 7 illustrates. The chargeable device 10 may further include a control circuit 71. The control circuit 71 may communicate with the adapter bidirectionally through the data line to control the output of the adapter operable in the second charging mode. Take the charging interface as a USB port for example. The data line may be a D+ line and/or D− line in the USB port.

The present disclosure does not limit the communicative contents between the control circuit 71 of the adapter and the chargeable device. The present disclosure does not limit how the control circuit 71 controls the output of the adapter operable in the second charging mode. For example, the control circuit 71 can communicate with the adapter, interact the present total voltage of the multiple cells 13 with the present total electricity of the multiple cells 13 in the chargeable device, and adjust the voltage or current outputted by the adapter based on the present total voltage or the present total electricity of the multiple cells 13. The interactive contents between the control circuit 71 and the adapter and the method of controlling the output of the adapter operable in the second charging mode are detailed as follows.

The present disclosure does not limit priority and subordination of the adapter and the chargeable device (or the control circuit 71 of the chargeable device). In other words, either one of the adapter or the chargeable device acts as a primary device and actively communicates with the other. Correspondingly, the other acts as a secondary device and offers a first reply or a first response to the communication from the primary device. Optionally, the voltage level of the adapter and the voltage level of the chargeable device are compared with the voltage level of ground in the process of communication to ensure which one is primary device and which one is the secondary device.

The present disclosure does not limit priority and subordination of the adapter and the chargeable device. In other words, either one of the adapter or the chargeable device acts as a primary device and actively communicates with the other. Correspondingly, the other acts as a secondary device and offers a first reply or a first response to the communication from the primary device. At the same time, the primary device offers a second reply or a second response in response to the first reply or the first response from the secondary device. Therefore, the negotiation process of a charging mode between the adapter and the chargeable device is finished. Optionally, in some embodiments, after several negotiations for the charging mode between the primary device and the secondary device are completed, a charging operation between the primary device and the secondary device is performed to ensure safe and reliable performance of the charging.

The primary device may offer the second response or the second reply based on the first response or the first reply from the secondary device in communication. One method may include: The primary device can receive the first response or the first reply from the secondary device in communication and offer the second response or the second reply based on the first response or the first reply from the secondary device accordingly. For example, when the primary device receives the first response or the first reply from the secondary device in communication within the predetermined time, the primary device offers the second response or the second reply based on the first response or the first reply from the secondary device. Specifically, the negotiation process of a charging mode between the primary device and the secondary device is finished. The primary device and the secondary device perform the charging on the first charging mode or the second charging mode based on the negotiation result. That is, the adapter charges the chargeable device on the first charging mode or the second charging mode based on the negotiation result.

The primary device may offer the second response or the second reply based on the first response or the first reply from the secondary device in communication. Another method may include: The primary device does not receive the first response or the first reply from the secondary device in communication but still offers the second response or the second reply based on the first response or the first reply from the secondary device accordingly. For example, when the primary device does not receive the first response or the first reply from the secondary device in communication within the predetermined time, the primary device still offers the second response or the second reply based on the first response or the first reply from the secondary device. Specifically, the negotiation process of a charging mode between the primary device and the secondary device is finished. The primary device and the secondary device perform the charging operable in the second charging mode or the second charging mode based on the negotiation result. That is, the adapter charges the chargeable device operable in the second charging mode or the second charging mode based on the negotiation result.

Optionally, to serve as one embodiment, a chargeable device, as a primary device, starts to communicate, and an adapter, as a secondary device, offers a first reply or a first response in response to the primary device's communication. Afterwards, the chargeable device does not need to offer a second reply or a second response in response to the adapter's first reply or first response accordingly. Therefore, the negotiation process of a charging mode between the adapter and the chargeable device is finished. Further, the adapter can charge the chargeable device either operable in the second charging mode or operable in the second charging mode based on the negotiation result.

Optionally, to serve as one embodiment, when the control circuit 71 communicates with an adapter bidirectionally through a data line to control the output of the adapter operable in the second charging mode, the control circuit 71 communicates with the adapter bidirectionally to negotiate the charging mode between the adapter and the chargeable device.

Optionally, to serve as one embodiment, when the control circuit 71 communicates with an adapter bidirectionally to negotiate the charging mode between the adapter and the chargeable device, the control circuit 71 receives a first instruction sent by the adapter, the first instruction being configured to inquire whether the chargeable device enables the second charging mode; the control circuit 71 also sends a reply instruction responsive to the first instruction to the adapter, and the reply instruction responsive to the first instruction being configured to ask the chargeable device whether to allow to enable the second charging mode; and the control circuit 71 further controls the adapter to charge the multiple cells through the first charging circuit 12 on condition that the chargeable device agrees to enable the second charging mode.

Optionally, to serve as one embodiment, when the control circuit 71 communicates with an adapter bidirectionally through a data line to control the output process of the adapter operable in the second charging mode, the control circuit 71 communicates with the adapter bidirectionally to ensure a charging current outputted by the adapter operable in the second charging mode and configured to charge a chargeable device.

Optionally, to serve as one embodiment, when the control circuit 71 communicates with an adapter bidirectionally to ensure a charging voltage outputted by the adapter operable in the second charging mode and configured to charge a chargeable device, the control circuit 71 receives a second instruction sent by the adapter; the second instruction being configured to inquire whether the voltage outputted by the adapter matches the present total voltage of the multiple cells 13; the control circuit 71 further sends a reply instruction responsive to the second instruction to the adapter, the reply instruction responsive to the second instruction being configured command the voltage outputted by the adapter to match the present total voltage of the multiple cells 13 or to make the voltage outputted by the adapter and the present total voltage of the multiple cells 13 higher or lower. Alternatively, the second instruction may be configured to inquire whether the present voltage outputted by the adapter acting as a charging voltage for the chargeable device is suitable operable in the second charging mode. The reply instruction responsive to the second instruction may be configured to indicate that the voltage outputted by the adapter matches the present total voltage of the multiple cells 13 or the voltage outputted by the adapter is greater than the present total voltage of the multiple cells 13, or the voltage outputted by the adapter is less than the present total voltage of the multiple cells 13. The present output voltage of the adapter matching the present total voltage of the multiple cells 13 or the present output voltage of the adapter acting as the charging voltage for the chargeable device suitable operable in the second charging mode means that the present output voltage of the adapter is slight greater than the present total voltage of the multiple cells 13 and that the difference between the output voltage of the adapter and the present total voltage of the multiple cells 13 is within a predetermined range (usually order of magnitude of hundreds of millivolts).

Optionally, to serve as one embodiment, when the control circuit 71 communicates with an adapter bidirectionally through the data line to control the output of the adapter operable in the second charging mode, the control circuit 71 communicates with the adapter bidirectionally to ensure a charging current outputted by the adapter operable in the second charging mode and configured to charge a chargeable device.

Optionally, to serve as one embodiment, when the control circuit 71 communicates with an adapter bidirectionally to ensure a charging current outputted by the adapter operable in the second charging mode and configured to charge a chargeable device, the control circuit 71 receives a third instruction sent by the adapter; the third instruction being configured to inquire the maximum charging current for the chargeable device currently; the control circuit 71 further sends a reply instruction responsive to the third instruction to the adapter. The reply instruction responsive to the third instruction is configured to indicate the maximum charging current for the chargeable device. The adapter adjusts an outputted charging current operable in the second charging mode based on the reply instruction responsive to the third instruction and indicative of the maximum charging current for the chargeable device. It is understood that there are many charging methods for the maximum charging current for the chargeable device currently to ensure the charging current outputted by the second adapter for the chargeable device operable in the second charging mode based on the maximum charging current for the chargeable device currently for the control circuit 71. For example, the second adapter ensures that the maximum charging current for the chargeable device currently is for the charging current for the chargeable device. Or for example, the charging current outputted by the second adapter operable in the second charging mode for the chargeable device is ensured after the maximum charging current for the chargeable device currently and the capacity of current output are taken into considerations.

Optionally, to serve as one embodiment, when the control circuit 71 communicates with an adapter bidirectionally through the data line to control the output of the second adapter operable in the second charging mode, the control circuit 71 communicates with the adapter bidirectionally operable in the second charging mode to adjust a current outputted by the adapter.

Optionally, to serve as one embodiment, when the control circuit 71 communicates with an adapter bidirectionally to adjust a current outputted by the adapter, the control circuit 71 receives a fourth instruction sent by the adapter, the fourth instruction being configured to inquire the present total voltage of the multiple cells; the control circuit 71 further sends a reply instruction responsive to the fourth instruction to the adapter, and the reply instruction responsive to the fourth instruction being configured to indicate the present total voltage of the multiple cells. The adapter can adjust the current output based on the present total voltage of the multiple cells.

Optionally, to serve as one embodiment, a process that the control unit 71 communicates with an adapter bidirectionally through the data line to control an output process of the adapter on a second charging mode includes: the control unit 71 bidirectionally communicates with the adapter to ensure whether there is a bad contact of the charging interface.

Specifically, the process that the control unit 71 bidirectionally communicates with the adapter to ensure whether there is a bad contact of the charging interface may include: the control unit 71 receives a fourth instruction sent by the adapter, and the control unit 71 sends a reply instruction responsive to the fourth instruction. The fourth instruction is configured to inquire a present voltage of a battery of a chargeable device. The reply instruction responsive to the fourth instruction is configured to indicate the present voltage of the battery of the chargeable device to ensure whether a bad contact of the charging interface exists based on the voltage outputted by the adapter and the present voltage of the battery of the chargeable device. For example, if the difference of the voltage outputted by the adapter and the present voltage of the battery of the chargeable device is greater than a predetermined threshold, the difference divided by a present current outputted by the adapter equals an impedance, and the impedance is greater than an impedance threshold, which implies that a bad contact of the charging interface exists.

Optionally, to serve as one embodiment, whether a bad contact of the charging interface exists can be determined with the chargeable device. For example, the control unit 71 sends a sixth instruction. The sixth instruction is configured to inquire a voltage outputted by an adapter. The control unit 71 receives a reply instruction responsive to the sixth instruction sent by the adapter. The reply instruction responsive to the sixth instruction is configured to indicate a voltage outputted by the adapter. The control unit 71 ensures whether a bad contact of the charging interface exists based on a present voltage of a battery and the voltage outputted by the adapter. After ensuring the bad contact of the charging interface, the control unit 71 sends a fifth instruction. The fifth instruction is configured to indicate the bad contact of the charging interface. The adapter may terminate from the second charging mode after receiving the fifth instruction.

Figure 8:
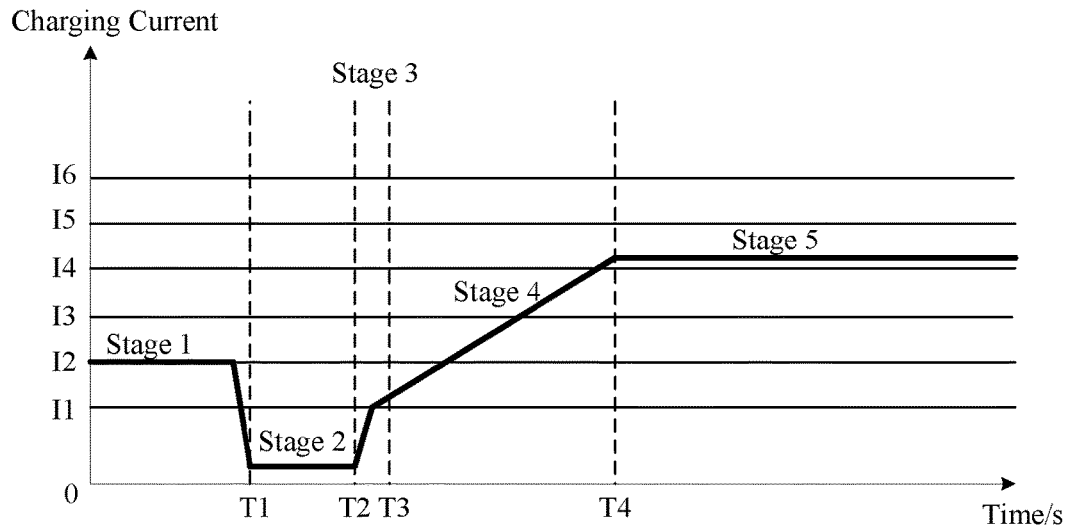
FIG. 8 illustrates a flowchart of a fast charging process according to one embodiment of the present disclosure.

Accompanied by FIG. 8, the present embodiment details a communication process between the adapter and the chargeable device (specifically performed by the control circuit inside the chargeable device). It is understood that the example shown in FIG. 8 merely help a person skilled in the art understand the present embodiment rather than limit the number of scenes. A person skilled in the art can modify or change the embodiment correspondingly according to the example shown in FIG. 8. Such modifications or changes are within the scope of the present embodiment.

As illustrated in FIG. 8, the communication process (or called "fast communication process") between the adapter and the chargeable device may include Stage 1, Stage 2, Stage 3, Stage 4, and Stage 5.

Stage 1:

After the chargeable device and a power supply device are coupled, the chargeable device may detect the type of power supply device via data lines D+ and D−. When the chargeable device detects the power supply device to be the adapter, the current absorbed by the chargeable device is greater than the predetermined current threshold I2(such as 1A). When the adapter detects the current outputted by the adapter greater than or equal to the predetermined current threshold I2 within the predetermined duration (for example, a continuous T1 duration), the adapter may regard the type of the power supply device is recognized by the chargeable device. Afterwards, the adapter starts to negotiate with the chargeable device and sends Instruction 1 (corresponding to the above-mentioned first instruction) to the chargeable device to inquire whether the chargeable device agrees the adapter to charge the chargeable device operable in the second charging mode.

When the adapter receives the reply instruction responsive to Instruction 1 sent by the chargeable device, and the reply instruction responsive to Instruction 1 indicates that the chargeable device does not agree the adapter to charge the chargeable device operable in the second charging mode, the adapter detects the output current of the adapter again. When the current outputted by the adapter is still greater than or equal to I2 in a predetermined continuous duration (for example, a continuous T1 duration), the adapter sends the reply instruction responsive to Instruction 1 to the chargeable device again. The adapter inquires the chargeable device to agree to charge the chargeable device with the adapter operable in the second charging mode. The adapter repeats the operation at Stage 1 until the chargeable device agrees the adapter to charge the chargeable device operable in the second charging mode or the current outputted by the adapter no longer satisfies the requirement of the output current greater than or equal to I2.

When the chargeable device agrees the adapter to charge the chargeable device operable in the second charging mode, the communication process enters Stage 2.

Stage 2:

The voltage outputted by the adapter may include a plurality of levels. The adapter sends instruction 2 to the chargeable device (corresponding to the second instruction) to inquire whether the voltage outputted by the adapter (the present output voltage) matches the present total voltage of the multiple cells (the present total voltage of the multiple cells).

The chargeable device sends the reply instruction responsive to Instruction 2 to indicate that the voltage outputted by the adapter matches the present total voltage of the chargeable device (the present total voltage of the multiple cells), the voltage outputted by the adapter is greater than or less than the present total voltage of the chargeable device (the present total voltage of the multiple cells). If the reply instruction responsive to Instruction 2 is to make the voltage outputted by the adapter and the present total voltage of the chargeable device (the present total voltage of the multiple cells) higher or lower, the adapter can adjust one level of the voltage outputted by the adapter and sends the reply instruction responsive to Instruction 2 to the chargeable device to inquire whether the voltage outputted by the adapter matches the present voltage (the present total voltage of the multiple cells) of the battery again. The operation at Stage 2 are repeated until the chargeable device ensures that the voltage outputted by the adapter matches the present voltage (the present total voltage of the multiple cells) of the battery. Afterwards, Stage 3 starts.

Stage 3:

The adapter sends Instruction 3 (corresponding to the above-mentioned the third instruction) and inquires the maximum charging current supported by the chargeable device currently. The chargeable device sends the reply instruction responsive to Instruction 3 to the adapter to indicate the maximum charging current supported by the chargeable device currently. Afterwards, Stage 4 starts.

Stage 4:

Based on the maximum charging current supported by the chargeable device currently, the charging current outputted by the adapter to charge the chargeable device operable in the second charging mode. Afterwards, Stage 5 starts, that is, constant current charging stage.

Stage 5:

When entering the constant current charging stage, the adapter sends Instruction 4 (corresponding to the above-mentioned fourth instruction) to the chargeable device every interval of time and inquire the present voltage (e.g. the total voltage of the multiple cells) of the battery of the chargeable device. The chargeable device sends the reply instruction responsive to Instruction 4 to the adapter to feedback the present voltage (the total voltage of the multiple cells) of the battery. The adapter can detect whether the connection of the charging interface is normal based on the present voltage (the total voltage of the multiple cells) of the battery and whether the current outputted by the adapter needs lower. When the connection of the charging interface is poor, the chargeable device sends Instruction 5 (corresponding to the above-mentioned fifth instruction), the adapter retreats from the second charging mode, resets to enter Stage 1.

Optionally, to serve as one embodiment, a chargeable device sends a reply instruction responsive to Instruction 1 at Stage 1. The reply instruction responsive to Instruction 1 may attach data (or information) of a path impedance of the chargeable device. The connection of the charging interface is detected to be normal with the path impedance of the chargeable device at Stage 5.

Optionally, to serve as one embodiment, a time period, from the time that the chargeable device agrees the adapter charging the chargeable device operable in the second charging mode until the time that an output voltage of the adapter is adjusted to a suitable charging voltage, may be set as a predetermined time period at Stage 2. If the time goes beyond the predetermined time period, the adapter or the chargeable device is detected to be abnormal in the communication process and then resets to enter Stage 1.

Optionally, to serve as one embodiment, the voltage outputted by the adapter is higher than the present voltage of the battery of the chargeable device (the present total voltage of the multiple cells) by $\Delta V$ ($\Delta V$ can range from 200 mV to 500 mV) at Stage 2. The chargeable device may send a reply instruction responsive to Instruction 2 to the adapter to indicate that the voltage outputted by the adapter matches the voltage of the battery of the chargeable device (the present total voltage of the multiple cells).

Optionally, to serve as one embodiment, the adjustment speed of a current outputted by an adapter can be controlled within limits at Stage 4. In this way, the charging process will not be abnormal once the adjustment speed is a bit high.

Optionally, to serve as one embodiment, a variation of a current outputted by an adapter is controlled within five percent (5%) of the output current at Stage 5.

Optionally, to serve as one embodiment, an adapter can detect a path impedance of a charging circuit in real time at Stage 5. Specifically, the adapter can detect the path impedance of the charging circuit based on an output voltage and an output current of the adapter and the present voltage (present total voltage of the multiple cells) of the battery feedback by the chargeable device. Since "path impedance of charging circuit" greater than "path impedance of charging circuit plus impedance of charging cable" indicates a bad contact of a charging interface, the adapter stops charging the chargeable device operable in the second charging mode.

Optionally, to serve as one embodiment, after the adapter starts to charge the chargeable device operable in the second charging mode, communication interval between the adapter and the chargeable device is controlled within limits to prevent abnormality from occurring in the communication process because the interval is too short.

Optionally, to serve as one embodiment, termination of the charging process (or termination of the charging process of the adapter to a chargeable device under the second mode) may be divided into recoverable termination and unrecoverable termination.

For example, upon a condition that the battery (the multiple cells) of the chargeable device is full or a bad contact of the charging interface is detected, the charging process terminates, the charging communication process resets, and the charging process enter Stage 1 again. Afterwards, the charging process enters Stage 2 if the chargeable device does not agree the adapter to charge the chargeable device operable in the second charging mode. Such kind of termination of the charging process is regarded as unrecoverable termination.

Or for example, when the communication between the adapter and the chargeable device is abnormal, the charging process terminates, the charging communication process resets, and the charging process enters Stage 1 again. After the requirement of Stage 1 is fulfilled, the chargeable device agrees the adapter to charge the chargeable device operable in the second charging mode to recover the charging process. Such kind of termination of the charging process may be regarded as recoverable termination.

Or for example, when the chargeable device detects the battery (the multiple cells) is abnormal, the charging process terminates, the charging process resets, and the charging process enters Stage 1 again. Afterwards, the chargeable device does not agree the adapter to charge the chargeable device operable in the second charging mode. When the battery (the multiple cells) becomes normal again, and the requirement of Stage 1 is fulfilled, the chargeable device agrees the adapter to charge the chargeable device operable in the second charging mode. Such kind of termination of the charging process may be regarded as recoverable termination.

The blocks or operations illustrated in FIG. 8 are merely an exemplary. For example, after the chargeable device and the adapter are coupled at Stage 1, handshake communication between the chargeable device and the adapter may be launched by the chargeable device as well; that is the chargeable device sends Instruction 1 and inquires whether the adapter enables the second charging mode. When the chargeable device receives the reply instruction of the adapter to indicate that the adapter agrees to charge the chargeable device operable in the second charging mode, the adapter starts to charge the battery (the multiple cells) of the chargeable device operable in the second charging mode.

In another embodiment, a stage of constant voltage charging may be further included after Stage 5 finishes. Specifically, the chargeable device feedbacks the present voltage of the battery (the present total voltage of the multiple cells) to the adapter at Stage 5. When the present voltage of the battery (the present total voltage of the multiple cells) reaches a threshold of charging voltage, the chargeable device is charged by a constant voltage from the constant current. At the stage of constant voltage charging, the charging current gradually lessens. When the charging current lowers to a certain threshold, the battery (the multiple cells) of the chargeable device is filled and the charging process stops.

The device proposed by the present embodiment is detailed, as shown FIG. 1 to FIG. 8. The method proposed by the present embodiment is detailed, as shown FIG. 9. It is understood that the description of the method and the description of the device correspond to each other. For simplicity, some repetitions are omitted.

Figure 9:
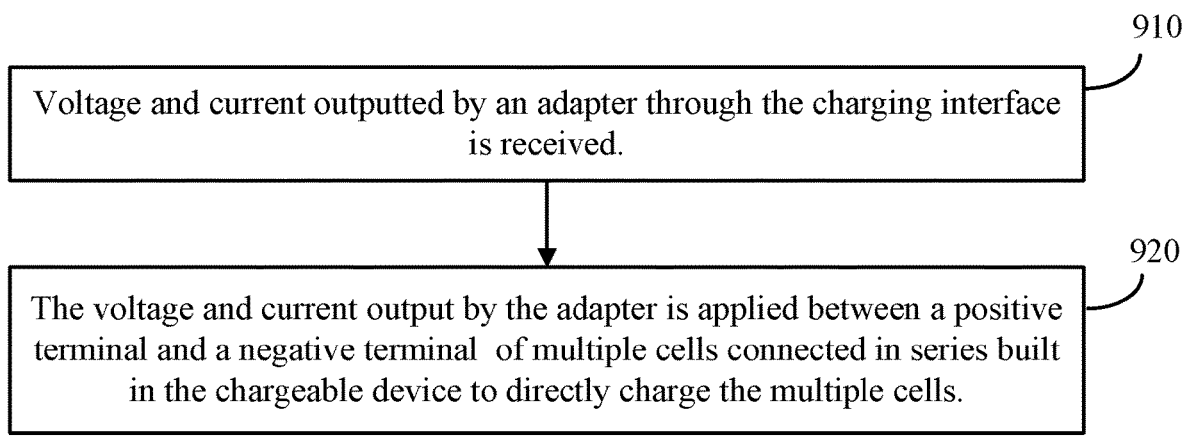
FIG. 9 illustrates a flowchart of a charging method according to one embodiment of the present disclosure.

FIG. 9 illustrates a flowchart of a charging method according to one embodiment of the present disclosure. The chargeable device including a charging interface is charged by the charging method as illustrated in FIG. 9.

The charging method includes block 910 and block 920.

At block 910, voltage and current outputted by an adapter through the charging interface is received.

At block 920, the voltage and current outputted by the adapter is applied between two terminals of multiple cells coupled in series built in the chargeable device to directly charge the multiple cells.

Optionally, to serve as one embodiment, the charging method illustrated in FIG. 9 further includes: electrical power suitable for the components of the chargeable device is supplied based on the voltage of the selected one of the multiple cells.

Optionally, to serve as one embodiment, the charging method illustrated in FIG. 9 further includes: voltage between the multiple cells is balanced.

Optionally, to serve as one embodiment, the charging method as illustrated in FIG. 9 further includes: the voltage outputted by the adapter through the charging interface is converted to second voltage, and the second voltage is applied between the positive terminal and the negative terminal to charge the multiple cells. The second voltage is greater than a total voltage of the multiple cells.

Optionally, to serve as one embodiment, the adapter supports a first charging mode and a second charging mode. A charging rate of charging the chargeable device operable in the second charging mode is faster than a charging rate of charging the chargeable device operable in the second charging mode.

Optionally, to serve as one embodiment, the charging interface includes a data line. The charging method as illustrated in FIG. 9 further includes: the adapter is bidirectionally communicated with the chargeable device through the data line to control output of the adapter operable in the second charging mode.

Optionally, to serve as one embodiment, a process that the adapter is bidirectionally communicated with the chargeable device through the data line to control output of the adapter operable in the second charging mode includes: the adapter is bidirectionally communicated with the chargeable device to negotiate a charging mode between the adapter and the chargeable device.

Optionally, to serve as one embodiment, a process that the adapter is bidirectionally communicated with the chargeable device to negotiate a charging mode between the adapter and the chargeable device includes: a first instruction sent by the adapter is received, a reply instruction responsive to the first instruction is sent to the adapter, and the adapter is controlled to charge the multiple cells through the first charging circuit upon a condition that the chargeable device agrees to enable the second charging mode. The first instruction is configured to inquire whether the chargeable device enables the second charging mode. The reply instruction responsive to the first instruction is configured to ask the chargeable device whether to agree to enable the second charging mode.

Optionally, to serve as one embodiment, a process that the adapter is bidirectionally communicated with the chargeable device through the data line to control output of the adapter operable in the second charging mode includes: the adapter is bidirectionally communicated with the chargeable device to ensure a charging voltage outputted by the adapter operable in the second charging mode to charge the chargeable device.

Optionally, to serve as one embodiment, a process that the adapter is bidirectionally communicated with the chargeable device to ensure a charging voltage outputted by the adapter operable in the second charging mode to charge the chargeable device includes: a second instruction sent by the adapter is received, and a reply instruction responsive to the second instruction is sent to the adapter. The second instruction is configured to inquire whether the voltage outputted by the adapter matches a present total voltage of the multiple cells. The reply instruction responsive to the second instruction is configured to indicate that the voltage outputted by the adapter matches the present total voltage of the multiple cells, the voltage outputted by the adapter is greater than the present total voltage of the multiple cells, or the voltage outputted by the adapter is less than the present total voltage of the multiple cells.

Optionally, to serve as one embodiment, a process that the adapter is bidirectionally communicated with the chargeable device through the data line to control output of the adapter operable in the second charging mode includes: the adapter is bidirectionally communicated with the chargeable device to ensure a charging current outputted by the adapter operable in the second charging mode to charge the chargeable device.

Optionally, to serve as one embodiment, a process that the adapter is bidirectionally communicated with the chargeable device to ensure a charging current outputted by the adapter operable in the second charging mode to charge the chargeable device includes: a third instruction sent by the adapter is received, and a reply instruction responsive to the third instruction is sent to the adapter. The third instruction is configured to inquire a maximum charging current for the chargeable device. The reply instruction responsive to the third instruction is configured to indicate the maximum charging current for the chargeable device to ensure the charging current outputted by the adapter for the chargeable device operable in the second charging mode based on the maximum charging current for the chargeable device.

Optionally, to serve as one embodiment, a process that the adapter is bidirectionally communicated with the chargeable device through the data line to control output of the adapter operable in the second charging mode includes: the adapter is bidirectionally communicated with the chargeable device to adjust the current outputted by the adapter in a charging process operable in the second charging mode.

Optionally, to serve as one embodiment, a process that the adapter is bidirectionally communicated with the chargeable device to adjust the current outputted by the adapter in a charging process operable in the second charging mode: a fourth instruction sent by the adapter is received, and a reply instruction responsive to the fourth instruction is sent to the adapter. The fourth instruction is configured to inquire the present total voltage of the multiple cells. The reply instruction responsive to the fourth instruction is configured to indicate the present total voltage of the multiple cells. The adapter adjusts an outputted charging current based on the reply instruction responsive to the fourth instruction and indicative of the present total voltage of the multiple cells.

One having ordinary skill in the art may be aware that the units and steps of algorithm in the examples of the embodiments published by this application can be realized by electronic hardware, or combinations of computer software and electronic hardware. Whether the functions should be performed by hardware or software should depend upon the particular applications and design constraints of a technical solution. One skilled in the art may use different methods to implement the described functions for each specific application, but such implementation should not be considered as outside of the scope of the present disclosure.

One skilled in the art may clearly understand that they can refer to the corresponding process in the abovementioned embodiments of the method for the specific operating process of the abovementioned system, device, and units. No description is provided herein again for the convenience and succinctness of the description.

In the several embodiments provided by the application, it should be understood that the revealed system, device and method may be implemented in other ways. For example, the abovementioned embodiments of the device are merely schematic. For example, the division of the units is merely a division based on logical functions; it may be different when they are put into practice. For example, a plurality of units or components may be combined or integrated into another system, or some features may be ignored or not be performed. And another point is that the displayed or discussed coupling, direct coupling or communication can be done through some interfaces, devices, or indirect coupling or communication between units; they may be electrical, mechanical, or in other forms.

The units described as separated parts may or may not be physically separated. A part that appeared as a unit may or may not be a physical unit, i.e. it can locate in one place, or it can be distributed to multiple network units. Part of or all of the units can be selected based on actual needs to achieve the object of the solutions of the present embodiments.

Furthermore, each of the functional units in the embodiments of the present disclosure may be integrated in one processing unit, or may be independent units physically separated, or may integrate with another one or more units and appear as a single unit.

If the function is realized as a software functional unit and used or sold as a standalone product, it may be stored in a computer-readable storage medium. Based on such understanding, the technical solutions of the present disclosure per se, or its contribution to the related art, or the technical solution may be realized in a software product. The computer software product is stored in a storage medium, including several commands that enable a computer device (may be a personal computer, a server, or network device) to perform all or part of the steps of the methods of the various embodiments of the present disclosure. The storage medium includes U-disk, removable hard disk, read-only memory (ROM), random access memory (RAM), magnetic disk or compact disc (CD) and other medium that can store program codes.

What is claimed is:

1. A chargeable device, capable of being charged with a quick charging mode or a normal charging module, and the chargeable device, comprising:
    a charging interface;
    a first charging circuit, coupled to the charging interface; and
    a second charging circuit, coupled in parallel with the first charging circuit;
    wherein when the chargeable device is charged with the quick charging mode, the first charging circuit is selected and configured to receive voltage and current outputted by an adapter through the charging interface, and to apply the voltage and current outputted by the adapter on a positive terminal and a negative terminal of multiple cells coupled in series built in the chargeable device to charge the multiple cells directly; when the chargeable device is charged with the normal charging mode, the second charging circuit is selected and configured to receive the output voltage from the adapter via the charging interface, step up the received output voltage, and apply the step-up output voltage on two terminals of multiple cells coupled in series built in the chargeable device to charge the multiple cells; and
    wherein the chargeable device further comprises a step-down circuit coupled to two terminals of the multiple cells, the step-down circuit is configured to convert a total voltage of the multiple cells into a first voltage $V_1$ where $a \leq V_1 \leq b$, a indicates a least operating voltage of the chargeable device, and b indicates a maximum operating voltage of the chargeable device, wherein the step-down circuit is a charge pump.

2. The chargeable device of claim 1, further comprising:
    a supply circuit, coupled to one of the multiple cells and configured to supply electrical power suitable for the components of the chargeable device based on the voltage of the selected one of the multiple cells.

3. The chargeable device of claim 2, further comprising:
    a balance circuit, coupled to the multiple cells, configured to balance voltage between the multiple cells.

4. The chargeable device of claim 1, wherein the current outputted by the adapter and received by the first charging circuit is a pulsating direct current (DC) current, an alternating current, or a constant DC current.

5. The chargeable device of claim 1, wherein the voltage and current outputted by the adapter and received by the first charging circuit is configured to charge the multiple cells under a constant current mode.

6. The chargeable device of claim 1,
    wherein the second charging circuit comprises a voltage boost circuit coupled between the charging interface and the multiple cells,
    wherein the voltage boost circuit is configured to convert the voltage outputted from the adapter and received by the first charging interface into a second voltage, and the second voltage is applied between the positive terminal and the negative terminal of the multiple cells to charge the multiple cells, wherein the voltage value outputted from the adapter is less than a total voltage of the multiple cells, and the second voltage value is greater than the total voltage of the multiple cells.

7. The chargeable device of claim 6, wherein the voltage outputted by the adapter and received by the second charging circuit is five volts (5V).

8. The chargeable device of claim 6, wherein the chargeable device and the adapter are selectively operable in the normal charging mode or the quick charging mode, a charging rate of the chargeable device operable in the quick charging mode is faster than a charging rate of the chargeable device operable in the normal charging mode, the adapter charges the multiple cells through the first charging circuit when the chargeable device and the adapter are selectively operable in the quick charging mode, and the adapter charges the multiple cells through the second charging circuit when the chargeable device and the adapter are selectively operable in the normal charging mode.

9. The chargeable device of claim 8, wherein the charging interface comprises a data line, and the chargeable device further comprises a control circuit that supports bidirectional communication with the adapter through the data line to control output of the adapter operable in the quick charging mode.

10. The chargeable device of claim 9, wherein
the control circuit is configured to communicate with the adapter in a means of bidirectional communication to negotiate a charging mode which the chargeable device and the adapter are operable in.

11. The chargeable device of claim 10, wherein
the control circuit is configured to receive a first instruction sent by the adapter, the first instruction configured to inquire whether the chargeable device enables the quick charging mode;
the control circuit is further configured to send a reply instruction responsive to the first instruction to the adapter, the reply instruction responsive to the first instruction configured to indicate that the chargeable device whether agrees to enable the quick charging mode; and
the control circuit controls the adapter to charge the multiple cells through the first charging circuit when the chargeable device agrees to enable the quick charging mode.

12. The chargeable device of claim 1, wherein the voltage and current outputted by the adapter satisfies the requirement expected by the multiple cells.

13. The chargeable device of claim 9, wherein
the control circuit is configured to receive a second instruction sent by the adapter, the second instruction configured to inquire whether the voltage outputted by the adapter matches a present total voltage of the multiple cells; and
the control circuit is further configured to send a reply instruction responsive to the second instruction to the adapter, the reply instruction responsive to the second instruction configured to indicate that the voltage outputted by the adapter matches the present total voltage of the multiple cells, the voltage outputted by the adapter is less than the present total voltage of the multiple cells, or the voltage outputted by the adapter is greater than the present total voltage of the multiple cells.

14. The chargeable device of claim 9, wherein
the control circuit is configured to receive a third instruction sent by the adapter, the third instruction configured to inquire a maximum charging current for the chargeable device; and
the control circuit is further configured to send a reply instruction responsive to the third instruction to the adapter, the reply instruction responsive to the third instruction configured to indicate the maximum charging current for the chargeable device, whereby the adapter adjusts an outputted charging current operable in the quick charging mode based on the reply instruction responsive to the third instruction and indicative of the maximum charging current for the chargeable device.

15. The chargeable device of claim 9, wherein
the control circuit is configured to receive a fourth instruction sent by the adapter, the fourth instruction configured to inquire a present total voltage of the multiple cells; and
the control circuit is further configured to send a reply instruction responsive to the fourth instruction to the adapter, the reply instruction responsive to the fourth instruction configured to indicate the present total voltage of the multiple cells, whereby the adapter adjusts an outputted charging current based on the reply instruction responsive to the fourth instruction and indicative of the present total voltage of the multiple cells.

16. A charging method for charging a chargeable device comprising a charging interface, the charging method comprising:
receiving voltage and current outputted by an adapter through the charging interface; and
selecting a first charging circuit and applying the voltage and current outputted by the adapter between a positive terminal and a negative terminal of multiple cells coupled in series built in the chargeable device to directly charge the multiple cells via the first charging circuit, when the chargeable device is charged with a quick charging mode;
selecting a second charging circuit, and converting the voltage outputted by the adapter through the charging interface to a second voltage and applying the second voltage between the two terminals of the multiple cells to charge the multiple cells via the second charging circuit, when the chargeable device is charged with a normal charging mode, wherein the second voltage value is greater than a total voltage of the multiple cells; and
using a step-down circuit, coupled to two terminals of the multiple cells, to convert a total voltage of the multiple cells into a first voltage $V_1$ where $a \le V_1 \le b$, a indicates a least operating voltage of the chargeable device, and b indicates a maximum operating voltage of the chargeable device, wherein the step-down circuit is a charge pump.

17. The charging method of claim 16, further comprising:
supplying electrical power suitable for the components of the chargeable device based on the voltage of the selected one of the multiple cells.

18. The charging method of claim 17, further comprising:
balancing voltage between the multiple cells.

19. The charging method of claim 16, wherein the chargeable device and the adapter are selectively operable in the normal charging mode or the quick charging mode, and a charging rate of the chargeable device operable in the quick charging mode is faster than a charging rate of the chargeable device operable in the normal charging mode.

20. The charging method of claim 19, wherein the charging interface comprises a data line, the charging method further comprises:
- communicating with the adapter in a means of bidirectional communication through the data line to control output of the adapter operable in the quick charging mode.

21. The charging method of claim 20, wherein the communicating with the adapter in the means of bidirectional communication through the data line to control output of the adapter operable in the second charging mode comprises:
- communicating with the adapter in the means of bidirectional communication to negotiate a charging mode which the adapter and the chargeable device are operable in.

22. The charging method of claim 21, wherein the communicating with the adapter in the means of bidirectional communication to negotiate the charging mode which the adapter and the chargeable device are operable in, comprises:
- receiving a first instruction sent by the adapter, the first instruction configured to inquire whether the chargeable device enables the quick charging mode;
- sending a reply instruction responsive to the first instruction to the adapter, the reply instruction responsive to the first instruction configured to indicate that the chargeable device whether agrees to enable the quick charging mode; and
- controlling the adapter to charge the multiple cells through the first charging circuit when the chargeable device agrees to enable the quick charging mode.

23. The charging method of claim 20, wherein the communicating with the adapter in the means of bidirectional communication through the data line to control output of the adapter operable in the second charging mode, comprises:
- communicating with the adapter in the means of bidirectional communication to ensure a charging voltage outputted by the adapter operable in the quick charging mode to charge the chargeable device.

24. A chargeable device, capable of being charged with a quick charging mode or a normal charging module, comprising:
- a charging interface;
- a first charging circuit coupled to the charging interface; and
- a second charging circuit, coupled in parallel with the first charging circuit;
- wherein when the chargeable device is charged with the quick charging mode, the first charging circuit is selected and configured to receive voltage and current outputted by an adapter through the charging interface, and to apply the voltage and current outputted by the adapter between a positive terminal and a negative terminal of multiple cells connected in series built in the chargeable device to charge the multiple cells; when the chargeable device is charged with the normal charging mode, the second charging circuit is selected and configured to receive the output voltage from the adapter via the charging interface, step up the received output voltage, and apply the step-up output voltage on two terminals of multiple cells coupled in series built in the chargeable device to charge the multiple cells;
- wherein the chargeable device further comprises a step-down circuit coupled to two terminals of the multiple cells, the step-down circuit is configured to convert a total voltage of the multiple cells into a first voltage $V_1$ where $a \le V_1 \le b$, a indicates a least operating voltage of the chargeable device, and b indicates a maximum operating voltage of the chargeable device, wherein the step-down circuit is a charge pump; and
- wherein the adapter is capable of acquiring state information for the multiple cells and adjusting the voltage and current based on the acquired state information.

* * * * *